Aug. 29, 1967  H. O. CORBETT ET AL  3,337,914
STACKED EXTRUSION DIE
Filed Jan. 3, 1966  3 Sheets-Sheet 1
FIG. 1.
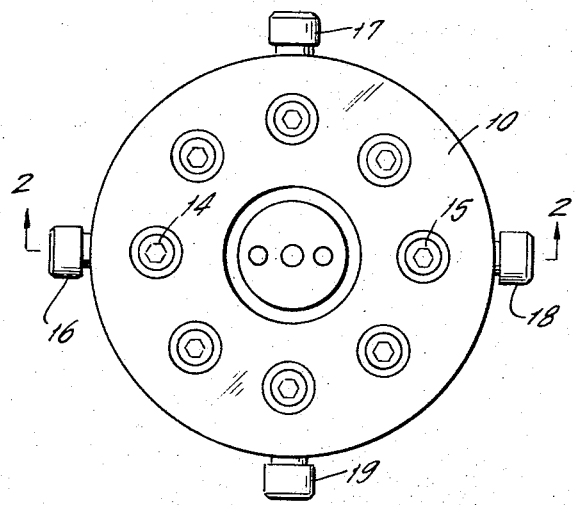
FIG. 2.
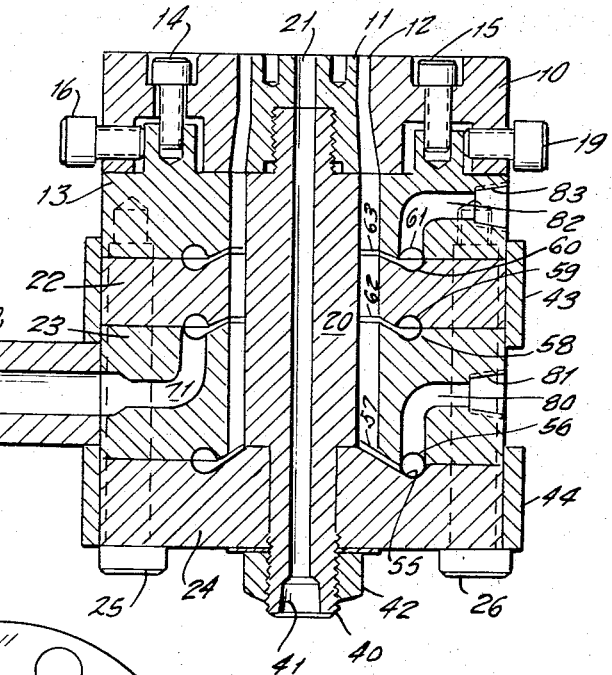
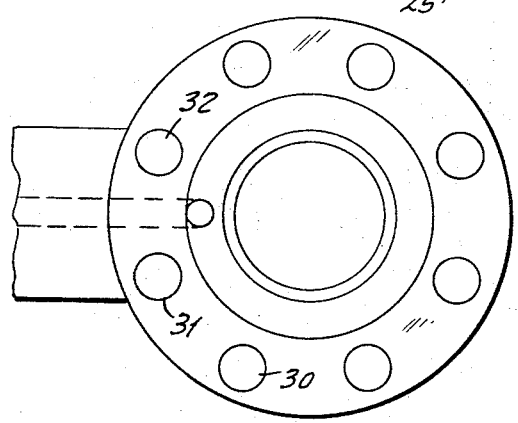
FIG. 3.
HERBERT O. CORBETT
JOHN J. QUACKENBUSH
INVENTOR.
BY *Allen A. Meyer Jr.*

HERBERT O. CORBETT
JOHN J. QUACKENBUSH
INVENTOR.

United States Patent Office 3,337,914
Patented Aug. 29, 1967

3,337,914
STACKED EXTRUSION DIE
Herbert Oliver Corbett, Bridgeport, and John Joseph Quackenbush, Monroe, Conn., assignors to National Distillers and Chemical Corporation, New York, N.Y., a corporation of Virginia
Filed Jan. 3, 1966, Ser. No. 518,148
2 Claims. (Cl. 18—13)

ABSTRACT OF THE DISCLOSURE

A stacked extrusion die having identical stacked die decks, each containing a central annular channel leading to a central opening, and each having a central input conduit with the central openings in each of the dies aligned with one another for extruding a multiple ply plastic sheath within the aligned central openings.

---

This invention relates to a novel extrusion die for the extrusion of multiwall thermoplastic pipe and coating of metal pipe wherein any desired number of decks can be stacked atop one another to define respective outlet orifices for the extrusion of an additional plastic layer.

The extrusion of a plurality of layers of diverse plastic materials in laminar flow extrusion apparatus is well known, and described, for example, in copending application Serial No. 350,220, filed Mar. 9, 1964, in the name of Corbett, entitled Laminated Products and Method and Apparatus for Producing Same, and assigned to the assignee of the present invention.

In addition, extrusion apparatus is known for the extrusion of a plastic coating on a metallic pipe which is fed into the center of the extrusion apparatus.

In many applications, varying numbers of plastic layers of diverse materials will be desired which leads to a relatively large inventory of different dies. The present invention is for a novel single die structure formed of a plurality of stacked decks of any desired number, whereby the stacked decks define respective outlet orifices between adjacent decks so that a die can be stacked as high as desired for any desired number of extruded layers.

As a further feature of this invention, a specific type of deck arrangement is provided for permitting a short residence time in the die during the extrusion of easily decomposable materials. This arrangement becomes important where plastic materials which are extremely sensitive to heat are being extruded such as vinylidene chloride (Saran). Thus an orifice arrangement is provided wherein materials flow into a continuous annular channel through separated annular segments which prevent the formation of a weld line.

Accordingly, a primary object of this invention is to provide a novel extrusion die which can define any desired number of concentric extrusion orifices.

Another object of this invention is to provide a novel die structure formed of a plurality of decks which can be stacked as high as desired with each of the decks defining a discharge orifice between them.

A further object of this invention is to form a novel extrusion die wherein the extrudate has a short residence time in the heated portion of the die.

These and other objects of this invention will be apparent from the following description when taken in connection with the drawings, in which:

FIGURE 1 is a top view of the novel extrusion die of the invention.

FIGURE 2 is a cross-sectional view of FIG. 1 taken across the line 2—2 in FIGURE 1.

FIGURE 3 is a top view of one of the decks of FIGURE 2.

Figure 4:
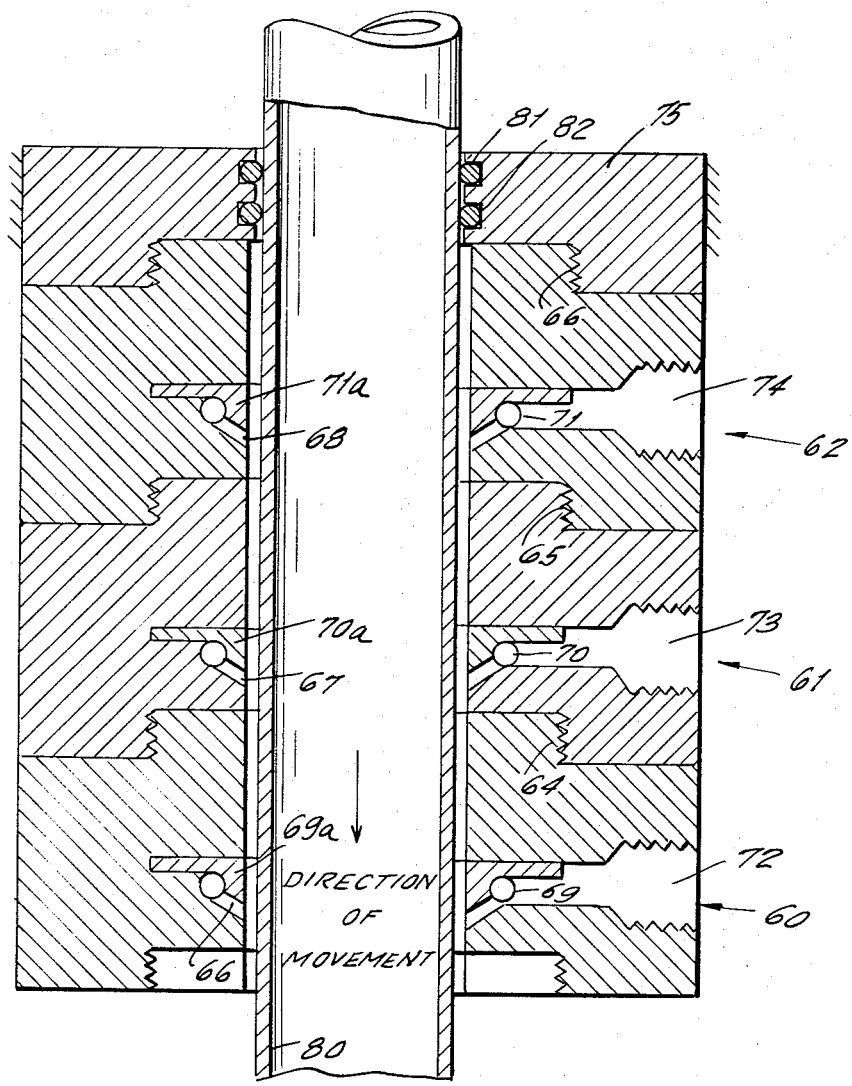
FIGURE 4 shows the manner in which the invention is applicable to pipe coating with a modified stack arrangement.
Figure 5:
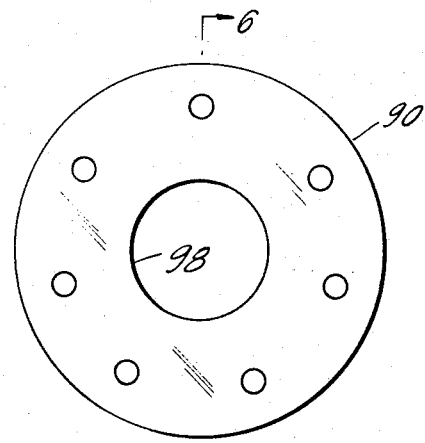
FIGURE 5 is a top view of a novel deck for use with easily decomposable materials.

Referring now to the figures, there is illustrated therein a die structure comprised of an outer cap section 10 which, together with an interior cap section 11, define a main discharge orifice 12 through which an extruded laminated plastic pipe may issue.

The outer cap 10 is bolted to a first and upper deck 13 by bolts such as bolts 14 and 15, and is concentrically positioned with respect to the first deck 13 by the positioning screws 16, 17, 18 and 19 which engage suitable extending posts extending from the upper deck 13. The inner cap 11 is then threaded onto a central mandrel 20 which has an opening 21 therein which extends through inner cap 11 and to the interior of the tube being extruded so that air pressure can be applied to the interior of the extruded tube to prevent its collapse.

The deck 13 seats upon a spacer deck 22 which, in turn, seats atop deck 23 which is carried by the bottom deck 24. A plurality of supporting bolts such as bolts 25 and 26 extend through aligned openings in the deck assembly, and are threadably received by tapped openings in the upper deck 13. Thus, in FIGURE 3, which shows deck 23, it is seen that there are a plurality of bolt openings such as openings 30, 31 and 32 which will receive the deck assembling bolts such as bolts 25 and 26 which hold the assemblage together.

The mandrel 20 then has a lower threaded extension 40 which defines an air connection nipple 41 and which is received by a lock nut 42 to rigidly hold the mandrel in position with respect to the die. Suitable heating bands such as heater bands 43 and 44 may then surround the die to provide the heat required in the usual manner.

The opposing surfaces of the various decks then define annular orifices which lead into the annular channel leading to discharge orifice 12. Thus, the bottom ring 24 is provided with an annular groove 55 which cooperates with the annular groove 56 at the bottom of deck 23 to form an annular band leading to the discharge orifice 57. In a similar manner, the other opposing surfaces of the various decks are provided with annular depressions 58, 59, 60 and 61 where annular depressions 58 and 59 lead to discharge orifice 62, while annular depressions 60 and 61 lead to discharge orifice 63.

The discharge orifice 62 is then connected to the main extruder feed by a suitable coupler 70 which is attached to the main extruder, and which communicates with a channel 71 in deck 23 which leads to channel 62. Auxiliary extruders, or extruder connections, are then connected to channel 80 in deck 23 which leads to discharge orifice 57, with channel 80 terminating in an extruder connection nipple 81. In a similar manner, a channel 82 is formed in upper deck 13, and terminates in a connection nipple 83 which is connectable to an extruder feed and communicates with discharge orifice 63.

It will now be apparent that the stacking of decks 13, 22, 23 and 24 defines three opposing surfaces, each of which form a discharge orifice which discharges into the main path of extruded flow. Moreover, this flow will be a laminar flow, as described in the above noted application Ser. No. 350,220.

If it is now desired to increase the number of layers of extruded material in the extruded tube formed by the die, it will be apparent that it is only necessary to stack one or more additional decks into the stack of FIGURE 2. It will be noted especially that the upper configuration of each of decks 22, 23 and 24 are identical to one another, while the lower deck surface configuration of decks 13, 22 and 23 are similarly identical. Therefore, these decks can be assembled interchangeably with one another.

If, for example, it is desired to add an additional two layers to the extruded film, it would only be necessary to interpose between, for example, decks 13 and 22 two additional decks, each identical to decks 22 and 23.

The manner in which the invention is applied to the coating of metal pipe is shown in FIGURE 4.

Thus, in FIGURE 4, there are provided three identical decks 60, 61 and 62 which are threaded together by their respective threaded extensions such as threaded extensions 63, 64 and 65. Each of decks 60, 61 and 62 have annular discharge channels 66, 67 and 68 in communication with annular channels 69, 70 and 71, respectively, which can be connected to respective extruders at extruder connections 72, 73 and 74, respectively. Note that the channels 69, 70 and 71 and channels 66, 67 and 68 are easily formed in the respective decks with the use of inserts 69a, 70a and 71a, respectively, to simplify machining problems. The upper deck 62 is then connected to stationary nut 75 which can support the assemblage, as shown.

A pipe 80, which is to be coated, then passes through the aligned central openings in decks 60, 61 and 62 and nut 75, and moves at a predetermined speed in a downwardly direction. Two suitable gaskets 81 and 82 seal the connection between pipe 80 and nut 75.

The outer diameter of pipe 80, together with the inner surface of the central opening in decks 60, 61 and 62, define an annular channel for receiving the plastic flow from discharge orifices 71, 70 and 69, in that sequence, whereby as the pipe 80 moves downwardly, it is continuously with the three layers of plastic issuing from these discharge orifices. Clearly, if additional layers of plastic are desired, it is only necessary to add additional decks to the stack of FIGURE 4.

Referring next to FIGURES 5 through 8, there is shown a novel deck structure which could be adapted for use in the stack of FIGURE 2 or FIGURE 4 for a stage in which a heat-sensitive plastic, such as vinylidene chloride is to be used for one of the layers. Note that the die arrangement of FIGURES 5 through 8 could also be used independently in a single layer extrusion process. When plastic material is applied to the annular channel of its die, such as channels 56, 59 and 60 in FIGURE 2, or channels 69, 70 and 71 in FIGURE 4, the molten plastic divides, and flows in a clockwise direction for the first half of the channel and in a counterclockwise direction in the second half of the channel, with these two flows merging at a point approximately 180° from the channel inlet. Note that this point of juncture between the two seam lines ultimately forms a "weld line" in the subsequently extruded plastic tube.

In the case of heat-sensitive materials, such as Saran, which readily decompose under heat, it is well known that some decomposition will occur at this juncture and dies frequently have vent ports at this point to release gas caused by the decomposition. In accordance with the invention, shown in FIGURES 5 through 8, an extrusion die is provided especially useful for readily decomposable plastics in which the residence time of the plastic in the die is reduced and the junction along a weld line is prevented.

This prevents the undue heating of the plastic and, therefore, inhibits the decomposition of the plastic material in the die.

Figure 6:
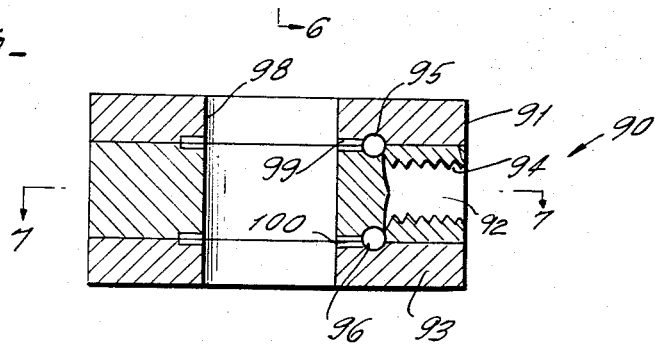
FIGURE 6 is a cross-sectional view of FIGURE 5 taken on lines 6—6 in FIGURE 5.
Figure 7:
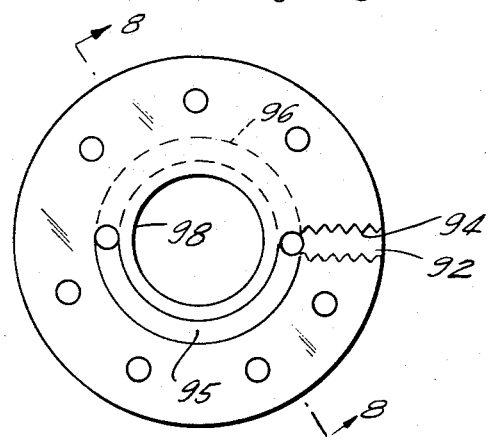
FIGURE 7 is a cross-sectional view of FIGURE 6 across lines 7—7 in FIGURE 6.
Figure 8:
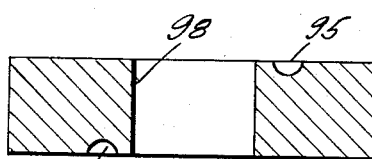
FIGURE 8 is a cross-sectional view of FIGURE 7 taken across line 8—8 in FIGURE 7.

More particularly, the die deck 90 is formed of three sections 91, 92 and 93. Suitable bolt holes can extend through the sections so deck 90 can be mounted in the arrangement of FIGURE 2. Section 92 is provided with a connection channel 94, which is connectable to a suitable extruder. Channel 94, in the past, has been connected to a continuous annular channel within the die, as in FIGURES 2 and 4. The present invention, however, connects channel 94 to auxiliary spaced channel segments 95 and 96 which overlap one another to form an effective continuous channel surrounding the interior diameter 98 of deck 90. More particularly, die section 91 has an annular section which extends for approximately 180° of arc and which cooperates with a similar annular section in the top of deck section 92 to form the annular section 95. This annular section 95 is connected to one half of the inner diameter 98 of the deck through discharge orifice 99 (FIGURE 6). In a similar manner, the annular section orifice 96 extends for approximately 180°, and is formed between deck section 93 and the bottom of deck section 92, and issues from discharge orifice 100. However, the two sections are 180° displaced from one another so they overlap as shown in FIGURE 6. Moreover, the sections are preferably tapered in depth from the inlet channel 94 to their ends, as understood from FIGURE 8.

In operation, it will be seen that the plastic issuing from orifices 99 and 100 coat respective halves of the diameter 98, and join only after leaving the die. Thus, the plastic has a short residence time in the die, as compared to the usual arrangement, and is less likely to decompose due to elevated die temperatures. Moreover, since channels 95 and 96 can overlap, weld lines in the plastic tube ultimately formed are avoided.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiment of the invention in which an exclusive privilege or property is claimed are defined as follows:

1. An extrusion die for the extrusion of a plurality of tubular laminated plastic layers; said extrusion die comprising a plurality of identical die decks stacked atop one another and having aligned central openings defining the exterior surface of a cylindrical chamber leading to a discharge orifice; each of said die decks having cooperating top and bottom surface configurations whereby said decks are connectable with one another; annular channel means formed within each of said plurality of die decks generally in planes parallel to said decks and centrally axially located within said decks; said annular channel means radially extending to the inner surface of their said central openings; and respective radial channel means in each of said decks, extending from said annular channels of each of said decks to the outside diameter of said decks; said radial channels terminating on the exterior diameter of said decks at a generally centrally axial location on said respective decks; and support means connected to each of said decks for rigidly connecting said decks together; and conduit means extending from each of said annular channel means to a region external of said die for connection to respective extruder supply means.

2. The device as set forth in claim 1 wherein one of said top or bottom surface configurations includes a threaded extension coaxial with said die decks, the other of said top or bottom configurations including a threaded extension of an adjacent die deck.

(References on following page)

References Cited

UNITED STATES PATENTS

| | | | |
|---|---|---|---|
| 1,637,207 | 7/1927 | Whitehouse | 18—14 |
| 2,174,779 | 10/1939 | Delorme | 18—13 |
| 2,820,249 | 1/1958 | Colombo | 18—12 X |

FOREIGN PATENTS

| | | |
|---|---|---|
| 520,637 | 6/1953 | Belgium. |
| 1,082,043 | 5/1960 | Germany. |

WILLIAM J. STEPHENSON, *Primary Examiner.*